United States Patent
Lee

(10) Patent No.: US 7,962,640 B2
(45) Date of Patent: Jun. 14, 2011

(54) SYSTEMS AND METHODS FOR UNIVERSAL REAL-TIME MEDIA TRANSCODING

(75) Inventor: Yiu-bun Lee, Kowloon (HK)

(73) Assignee: The Chinese University of Hong Kong, Hong Kong SAR (CN)

( * ) Notice: Subject to any disclaimer, the term of this patent is extended or adjusted under 35 U.S.C. 154(b) by 221 days.

(21) Appl. No.: 12/125,407

(22) Filed: May 22, 2008

(65) Prior Publication Data
US 2009/0006643 A1    Jan. 1, 2009

Related U.S. Application Data

(60) Provisional application No. 60/947,239, filed on Jun. 29, 2007.

(51) Int. Cl.
*G06F 15/16* (2006.01)

(52) U.S. Cl. ........... 709/231; 709/200; 345/672; 725/32

(58) Field of Classification Search .............. 709/200, 709/231; 345/672
See application file for complete search history.

(56) References Cited

U.S. PATENT DOCUMENTS

| | | | |
|---|---|---|---|
| 5,940,130 A | 8/1999 | Nilsson et al. | |
| 6,138,009 A | 10/2000 | Birgerson | |
| 6,138,147 A * | 10/2000 | Weaver et al. | 709/206 |
| 6,141,447 A | 10/2000 | Linzer et al. | |
| 6,275,536 B1 | 8/2001 | Chen et al. | |
| 6,310,915 B1 | 10/2001 | Wells et al. | |
| 6,526,099 B1 | 2/2003 | Christopoulos et al. | |
| 6,615,212 B1 * | 9/2003 | Dutta et al. | 1/1 |
| 6,671,322 B2 | 12/2003 | Vetro et al. | |
| 6,871,216 B2 * | 3/2005 | Miller et al. | 709/206 |
| 6,950,624 B2 | 9/2005 | Kim et al. | |
| 6,961,377 B2 | 11/2005 | Kingsley | |
| 6,970,506 B2 | 11/2005 | Kim et al. | |
| 6,993,081 B1 * | 1/2006 | Brunheroto et al. | 375/240.28 |
| 7,305,357 B2 * | 12/2007 | Hamilton | 705/27 |
| 7,373,413 B1 * | 5/2008 | Nguyen et al. | 709/231 |
| 7,454,526 B2 * | 11/2008 | Brown et al. | 709/246 |

(Continued)

FOREIGN PATENT DOCUMENTS
CN    1668109 A    9/2005
(Continued)

OTHER PUBLICATIONS
International Search Report PCT/CN2008/001075 dated Sep. 11, 2008.

*Primary Examiner* — John Follansbee
*Assistant Examiner* — Anthony Mejia
(74) *Attorney, Agent, or Firm* — Kilpatrick Townsend & Stockton LLP; Kenneth R. Allen

(57) ABSTRACT

Digital content is encoded and transmitted in form suitable for presentation in a variety of formats, particularly suited to mobile device environments. In specific embodiments, server-side, independent and integrated architectures are disclosed. In further specific embodiments, techniques for prefix, postfix, interrupted and midway insertions of generic data and multi-media data are disclosed together with techniques for seamlessly handling media duration, whether or not media duration is known. Still further, techniques are disclosed for retaining synchronization among inserted media segments, for reducing startup delay and for traffic smoothing, all as part of systems and techniques for media transcoding.

22 Claims, 8 Drawing Sheets

U.S. PATENT DOCUMENTS

| | | | |
|---|---|---|---|
| 2002/0196850 A1* | 12/2002 | Liu et al. | 375/240.12 |
| 2003/0131076 A1* | 7/2003 | Nelson et al. | 709/219 |
| 2004/0012627 A1* | 1/2004 | Zakharia et al. | 345/744 |
| 2004/0205473 A1* | 10/2004 | Fisher et al. | 715/500 |
| 2004/0258063 A1* | 12/2004 | Raith et al. | 370/389 |
| 2005/0172127 A1* | 8/2005 | Hartung et al. | 713/167 |
| 2006/0041674 A1* | 2/2006 | Reme | 709/231 |
| 2006/0198392 A1* | 9/2006 | Park et al. | 370/468 |
| 2006/0230169 A1 | 10/2006 | Kaplan et al. | |
| 2006/0259588 A1* | 11/2006 | Lerman et al. | 709/219 |
| 2007/0071037 A1* | 3/2007 | Abraham et al. | 370/503 |
| 2007/0083886 A1* | 4/2007 | Kauffman et al. | 725/34 |
| 2008/0021775 A1* | 1/2008 | Lerman et al. | 705/14 |
| 2008/0059647 A1* | 3/2008 | Jabri et al. | 709/231 |
| 2008/0285936 A1* | 11/2008 | Yampanis et al. | 386/46 |
| 2009/0160929 A1* | 6/2009 | Wu et al. | 348/14.09 |

FOREIGN PATENT DOCUMENTS

WO  WO 2006/012674 A1  2/2006

* cited by examiner

The interruption points may be different for different embedded media

Synchronization of the embedded media in the insertion media stream is lost.

SYSTEMS AND METHODS FOR UNIVERSAL REAL-TIME MEDIA TRANSCODING

CROSS-REFERENCES TO RELATED APPLICATIONS

This application claims benefit under 35 U.S.C. §119(e) of Provisional Patent Application Ser. No. 60/947,239 filed Jun. 29, 2007.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

This invention relates to systems for the processing of digitized media content, such as streamed video and audio programming for delivery to a variety of receiving devices, particularly for the delivery of video and audio programming to mobile telephones, and wireless PDAs equipped with displays, and more particularly to GPRS and 3G mobile telephone formats.

The Internet has shown rapid growth in terms of multimedia content deployment. Unlike web pages, where there is a standard (i.e., HTML) specifying the document encoding format, multimedia data by contrast are often encoded using different tools into many different encoding formats. This diversity of encoding formats has caused significant accessibility issues for end users, who may not have the tools or the expertise to select the right mechanisms to decode the encoded media data into the correct presentation format. As a further complication, continuous media such as audio and video are often delivered using streaming servers that implement certain streaming protocols. Despite the availability of de facto standards for streaming protocols, such as RTSP/RTP/RTCP, there are nevertheless other streaming protocols in use by various content providers that are incompatible with the standard protocols. Therefore, in addition to the content encoding format, the communication protocol between the server and the client is also not standardized, thus leading to further accessibility obstacles for the end user. Finally, with the rapid emergence of mobile devices such as mobile PDAs, GPRS mobile phones, and 3G mobile phones, even the original presentation formats of the media content, such as video resolution, video frame rate, video data rate, audio sampling rate, audio data rate, may not be compatible with the limited rendering capability available in the mobile device, thus making the received data useless.

What is needed is an improved method and system for transcoding and merging or inserting multi-media data for access to content in essentially real time.

SUMMARY OF THE INVENTION

According to the invention, data stream insertion is used for transcoding digital content essentially in real time into a form suitable for presentation on a variety of formats, particularly suited to mobile device environment and on-demand presentation. The end user may seamlessly access any content anywhere using any compatible device.

In specific embodiments, server-side, independent and integrated architectures are disclosed. In further specific embodiments, techniques for prefix, postfix, interrupted and midway insertions of generic data and multi-media data are disclosed together with techniques for seamlessly handling media duration, whether or not media duration is known. Still further, techniques are disclosed for reducing startup delay in a straight-forward or a pipelined environment. Still further, techniques for traffic smoothing are disclosed, all as part of systems and techniques for media transcoding. Still further techniques for error reporting are disclosed.

The invention will be better understood by reference to the following detailed description in connection with accompanying drawings.

DETAILED DESCRIPTION OF THE INVENTION

Figure 1:
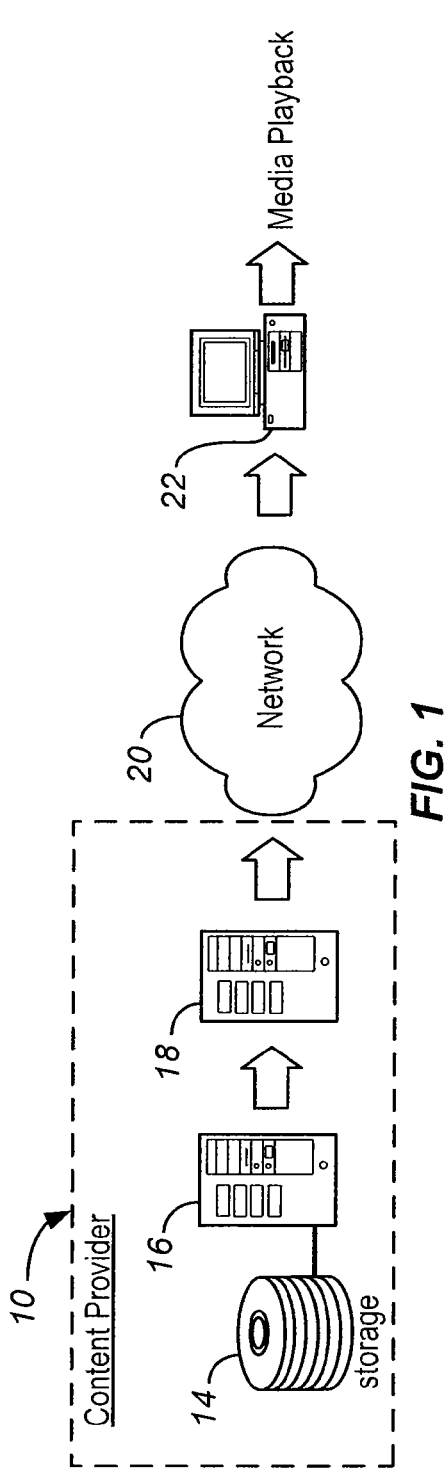
FIG. 1 is a block diagram of a system for server-side real-time transparent transcoding.
Figure 2:
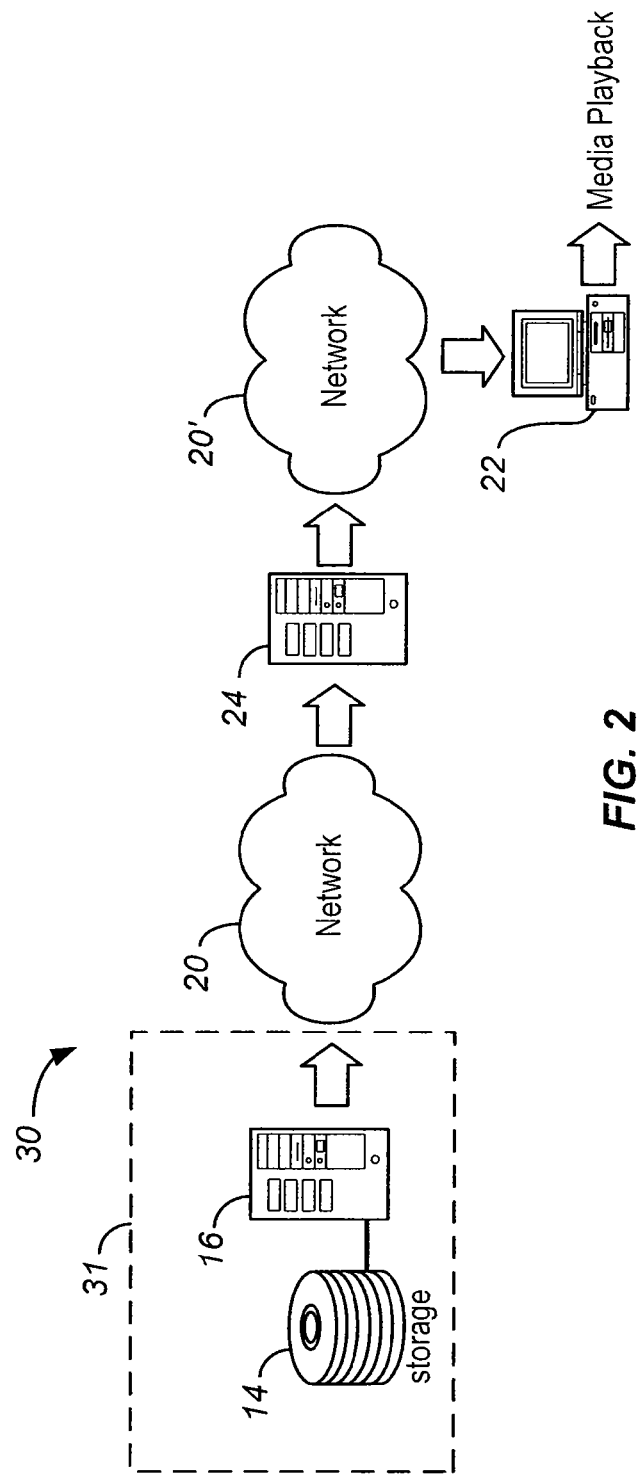
FIG. 2 is a block diagram of a system for independent real-time transparent transcoding.
Figure 3:
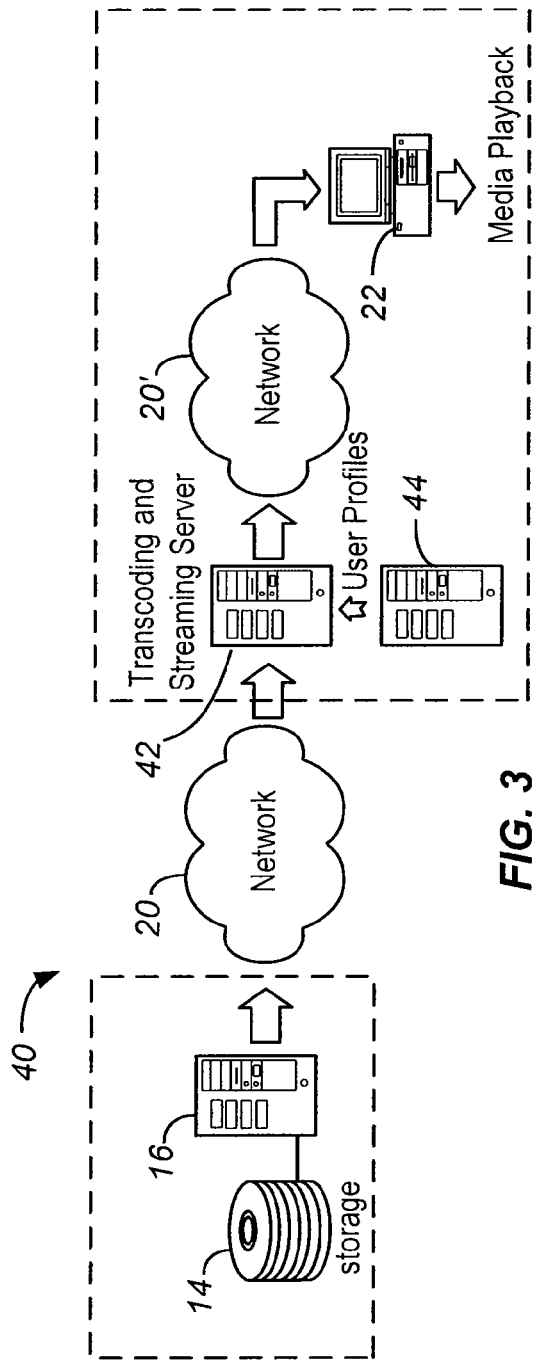
FIG. 3 is a block diagram of a system for integrated real-time transparent transcoding.

Incompatibilities that prevent a user from viewing any media content anywhere using any device at any time can be addressed by converting the source media content to a target media format while encoding parameters that are compatible with a user's device, and then delivering the media data to the user's device using a compatible protocol. This can be done in one of three ways, server-side real-time transcoding, independent real-time transcoding and integrated real-time transcoding. FIG. 1 illustrates a server-side real-time transcoding architecture. FIG. 2 illustrates an independent real-time transcoding architecture. FIG. 3 illustrates an integrated real-time transcoding architecture.

In FIG. 1, a server side encoding system 10 is embodied in a content provider that supplies content from content storage 14 to a media content server 16 that is coupled to a transcoding and streaming server 18 that is in turn connectable via a network cloud 20 to a user device 22 for media playback. This architecture is designed for content providers who want to operate and manage both the media content server 16 and the real-time transcoding server 18. With this architecture, the content provider 10 does not need to modify the existing user interface or backend systems (not shown), including media encoding, media storage, and media server. Compatible user's devices 22 are served using the network cloud 20 providing an appropriate conventional data path, i.e., via the existing media data format and media server. When an incompatible user comes online to request a service, the request will be redirected automatically to the transcoding system for service.

The transcoding server system 18, upon receiving the request from the user, requests the corresponding media data from the source media content server 16 (or directly to the media storage 14) and then performs on-the-fly transcoding to convert the media data into a format with encoding parameters that are compatible with the user's device 22. Furthermore, the transcoded media data is passed to the streaming server 16 for delivery to the user's device 22 using a compatible communication protocol.

This server-side transcoding architecture when used in accordance with the invention requires very little modification to the existing backend system. since the transcoded media format, encoding parameters, and communication protocol are compatible with user devices 22, and thus the system 10 can be readily deployed to enable the content provider 10 to significantly expand its potential user base. The following pseudo code would implement such a configuration:

Pseudo-Code: Server-Side Real-Time Transcoding
00 Phase 1—Setup
01 Option A—Using a Separate Server Domain
 02 Setup a separate server domain for mobile users, (e.g., "mobile.company.com") for the original www.company.com web site.
 03 Route all requests arriving at the separate server domain to the transcoding system.
04 Option B—Using the Same Server Domain
 05 Configure original web/media servers to detect requests originating from mobile handset (e.g., via HTTP or RTSP headers or some other means) and then forward them to the transcoding system (e.g., via HTTP forwarding).
06 Phase 2—Operation
 07 Receive requests from mobile handset.
 08 Determine the source of the original content requested.
 09 Determine the encoding format, streaming protocol, and presentation format for the mobile handset.
 10 Fetch the original content either directly or indirectly via a proxy cache.
 11 While receiving original content data, performs on-the-fly transcoding to convert the original content into the required encoding format, streaming protocol, and presentation format.
 12 Stream the transcoded content data to the mobile handset.

FIG. 2 depicts an architecture of an independent transcoding system 30. The content provider 31 supplies content storage 14 to a media content server 16 that is in turn connectable via a network cloud 20 to an external transcoding and streaming server 24, that in turn is connectable to the user device 22 via the network 20'. In this architecture, the transcoding system 24 is not co-located or managed by the content provider 31, but exists as independent servers connecting via one or more connections with the Internet network 20, 20'. There are two methods to make use of the independent transcoding service.

First, the user can configure its web browser on its user device 22 to make use of a web proxy server service already part of the transcoding system 24. The web proxy service is designed to accept standard web requests and fetch the requested web pages from the origin server 16. However, instead of passing the web content directly to the user device's web browser, the transcoder's web proxy server may parse the web page and then replace the embedded video URLs with virtual URLs that point to the transcoding server 24. Thus, when the user selects at the user device 22 the virtual URL, the request is sent to the transcoding server 24, which in turn fetches the media data from the origin media server 16, transcodes it, and then streams it to the user device 22 using a known compatible format, encoding parameters and communication protocol.

Second, the user may first select and visit a web page operated by the transcoding system 30. The web page allows the user to enter a URL to which to transfer or to perform a search for video content. In the former case, the transcoding system acts as an agent to fetch all subsequent web materials for the user and return the data to the user device's web browser. Thus, the user device's web browser communicates only with the transcoding system 30 through web protocols, and all web data first passes through the transcoding system 30. The transcoding system 30 then parses all web content and replaces media URLs with virtual URLs pointing to the transcoding system transcoding server 24. Thus when the user device is used to select the virtual URL, the request is sent to the transcoding server 24, which in turn fetches the media data from the origin server 16, transcodes it, and then streams it to the user device 22 using known compatible format, encoding parameters and communication protocol.

Independent transcoding architecture does not require any modification to origin servers 16 and thus can be deployed readily in the Internet environment.

The following pseudo-code illustrates implementation of this function.

Pseudo-Code: Independent Real-Time Transcoding
00 Phase 1—Setup
01 Option A—Using a Web Proxy Server
 02 Configure mobile handset-s web proxy setting to use the web proxy provided by the transcoding system. All web requests will then be routed to the transcoding system.
 03 Option B—Using a Web Front Page
 04 Cause the transcoding system to provide a web page for mobile users to input their desired destination URL to go to.
 05 Send via the mobile device through this front page all requests to the transcoding system.
06 Phase 2—Operation
 07 Receive web requests from mobile handset.
 08 Fetch web contents from original source and parse them to replace media URLs with virtual URLs pointing to the transcoding system's server.
 09 Receive media requests from mobile handset.
 10 Determine the source of the original content requested.
 11 Determine the encoding format, streaming protocol, and presentation format for the mobile handset.
 12 Fetch the original content either directly or indirectly via a proxy cache.
 13 While receiving original content data, perform on-the-fly transcoding to convert the original content into the required encoding format, streaming protocol, and presentation format.

14 Stream the transcoded content data to the mobile handset.

FIG. 3 depicts the architecture of an integrated transcoding system 40. As before, a content provider 31 supplies content storage 14 to a media content server 16 that is in turn connectable via a network cloud 20 to a transcoding and streaming server 42 enabled according to the invention with a user profile supplier 44 coupled to provide user profiles to the transcoding and streaming server 44 under control of a service provider. In this architecture the transcoding and streaming server 42 is in a system that is operated and managed by the service provider who provides network services to the end user. As such an operator typically manages both the transcoding system and the end-user system. This architecture allows the operator to seamlessly integrate the two systems to make the transcoding system as implemented according to the invention transparent to both end users and Internet content providers.

The operator can extend its current Internet/web proxy server (not shown) to intercept and translate video URLs to virtual URLs. When a user browses to a web page with media URLs, the extended proxy server (not shown) parses the web page and then replaces the embedded video URLs with virtual URLs that point to the transcoding server 42 modified according to the invention. Thus, when the user clicks the virtual URL, the request is sent to the transcoding server 42, which in turn fetches the media data from the origin server 16, transcodes it, and then streams it to the user device 22 using compatible format, encoding parameters, and communication protocol.

The following is pseudo-code supporting this implementation.

Pseudo-Code: Integrated Real-Time Transcoding
00 Phase 1—Setup
Option A—Using a Web Proxy Server
   02 Configure mobile handset's web proxy setting to use the web proxy provided by the transcoding system. All web requests will then be routed to the transcoding system.
03 Option B—Web Request Forwarding
   04 Cause the mobile operator to configure its servers and networks such that web requests are forwarded to the transcoding system.
05 Phase 2—Operation
   06 Receive web requests from mobile handset.
   07 Fetch web contents from original source and parse them to replace media URLs with virtual URLs pointing to the transcoding system's server.
   08 Receive media requests from mobile handset.
   09 Determine the source of the original content requested.
   10 Determine the encoding format, streaming protocol, and presentation format for the mobile handset.
   11 Fetch the original content either directly or indirectly via a proxy cache.
   12 While receiving original content data, perform on-the-fly transcoding to convert the original content into the required encoding format, streaming protocol, and presentation format.
   13 Stream the transcoded content data to the end user.

Transcoding for mobile devices has special challenges. Transcoding an Internet media stream to a mobile media stream often requires insertion of new media segments into the transcoded media stream to support various advanced features, such as start-up delay reduction, handling of end-of-stream condition, reporting errors and the like. The following methods describe new ways to implement stream insertion in the transcoding system.

Treatment of Generic Media Streams of Unknown Duration: The duration of the original media stream may not be known because (a) it is a live media stream with no preset duration; or (b) the duration information is not available. Both cases may be treated as if it is a media stream with no preset duration. The technique for inserting a new media segment into the transcoded media stream is described below.

Let $D_I$ be the duration of the inserted media stream. Without loss of generality assume the transcoded media stream to begin from playback time t=0. Let PTSo(t) be the original presentation time (measured in units as defined by the original media stream) for playback in time t of the transcoded media stream. Let FTC(u) be a "function to convert" the original presentation time to the transcoded media stream's presentation time.

To implement to the FTC(u) function without media insertion is given by:

$$FTC(u) = (u/q_O) q_T \qquad (1)$$

where u is the original media stream presentation time, $q_O$ and $q_T$ is the unit conversion factors for the original media stream and the transcoded media stream (e.g., in units per second) respectively. The conversion factor $q_O$ is fixed by the original media stream during encoding while $q_T$ is set by the transcoding system. The resultant presentation time is used by (a) the transcoding server to determine when to transmit the media data; (b) the transcoding server to compute the time stamps to be used in the streaming protocol (e.g., presentation timestamp in the Real Time Protocol); and (c) the client media playback software to determine when to display the media data.

Figure 4:
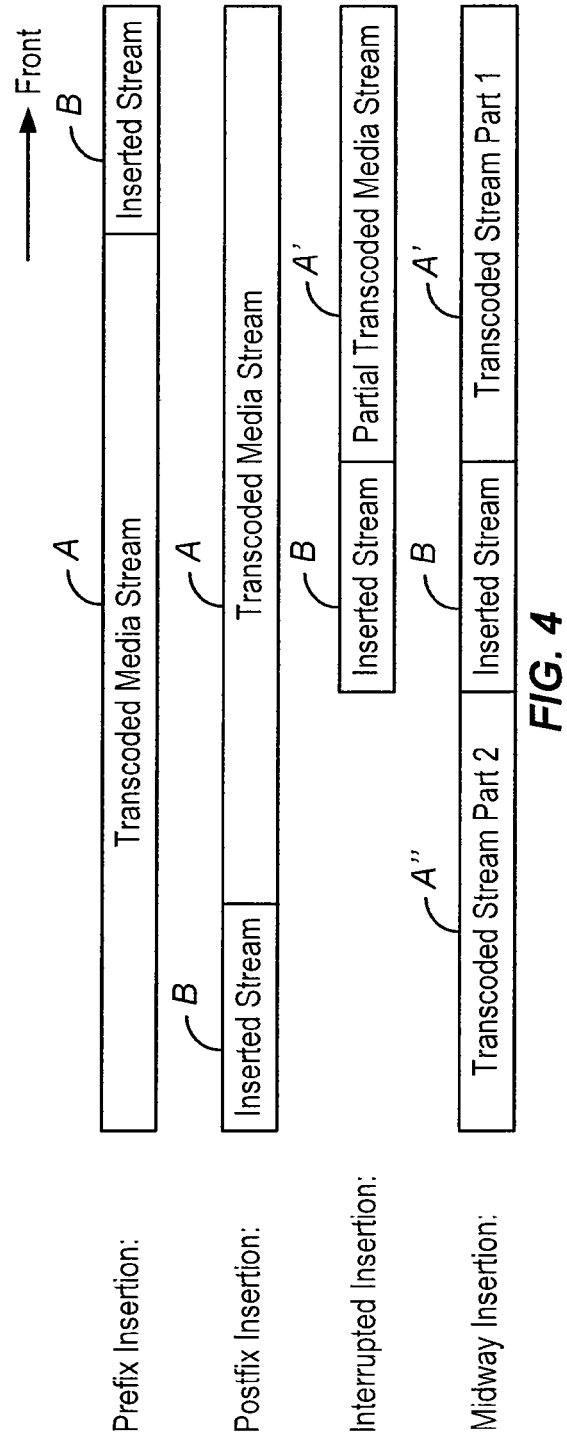
FIG. 4 is a timing diagram illustrating prefix, postfix, interrupted and midway insertion of generic media.

The need to maintain consistency of the presentation times creates problems when inserting a second media stream into the transcoded media stream. FIG. 4 illustrates four typical media insertion scenarios, prefix, postfix, interrupted and midway.

First is Prefix Insertion, i.e., inserting a second media stream B in front of (before) the transcoded media stream A. The insertion media stream is itself generated dynamically or pre-encoded using a compression format and encoding parameters compatible with the transcoded media stream. Typically, multiple versions of the insertion media stream are pre-encoded and stored in a file system accessible by the transcoding server 42. Upon execution, the transcoding server operates to select the matching version of the insertion media stream for use in the insertion process.

Let $q_I$ and $L_I$ be the unit conversion factor and duration of the insertion media stream; t, u, v denote the presentation time of the transcoded media stream, original media stream, and insertion media stream, respectively. To perform prefix insertion, the presentation times of the original media stream and the insertion stream both need to be converted to the transcoded media stream's presentation time base. First, the presentation time of the insertion media stream is converted to the presentation time of the transcoded media stream, e.g., $$v' = v \frac{q_T}{q_I} \qquad (2)$$

where v' is the converted presentation time in units of the transcoded media stream.

This conversion is typically done in real-time as data from the insertion media stream are scheduled for transmission. The transcoding server may or may not transmit the whole duration of the insertion media stream. In case the transcoding server determines to switch away from the insertion media stream before its end to the transcoded media stream, it will do so only after either (a) complete media frame (e.g., audio frame or video frame); or (b) complete media data group (e.g., a Group of Pictures in compressed video) are transmitted before executing the switchover. This is done to ensure that sufficient media information is transmitted to the client media playback element (through the user device 22) to correctly decode a complete media data unit of whatever unit definition. Otherwise it may lead to distortions or media quality degradations during the period around the switch-over point.

Assuming the server ends the insertion media stream after a duration of $t=l$ ($l \leq L_I$) time units, then the presentation time of the original media stream will be converted to the transcoded media stream by adjusting for the extra duration of $t=l$ time units of the inserted media stream, e.g., $$u' = u\frac{q_T}{q_O} + l \quad (3)$$

where u' is the converted presentation time in units of the transcoded media stream.

Postfix Insertion appends a second media stream to the transcoded media stream after the original media stream has ended. The operation is similar to Prefix Insertion except that the roles of original media stream and insertion media stream are swapped. Time bases and formats must be rendered compatible, but the boundary of the media unit of the transcoded media stream becomes the decision point for insertion.

Interrupted Insertion: Interrupted Insertion interrupts the original media stream before its natural end and immediately inserts the insertion media stream. The operation is similar to Postfix Insertion except that the original media stream is interrupted before its natural ending at a unit boundary. The balance of the transcoded media stream is lost.

Midway Insertion: Midway Insertion interrupts the original media stream before its natural end, e.g., at time $l_O$, and inserts the insertion media stream. After the end of the insertion media stream, e.g., at time $l_O+l_I$, the transcoding system will resume transcoding the original media stream from the last interruption point, i.e., at time $l_O$, as shown in FIG. 4. Therefore Midway Insertion requires two adjustments to the presentation times, the first one at time $l_O$ and the second one at time $l_O+l_I$.

Midway Insertion interrupts the original media stream before its natural end, say at time $l_O$, and inserts the insertion media stream. After the end of the insertion media stream, say at time $l_O+l_I$, the transcoding system will resume transcoding the original media stream from the last interruption point, i.e., at time $l_O$. Therefore Midway Insertion requires two adjustments to the presentation times, the first one at time $l_O$ and the second one at time $l_O+l_I$.

The first adjustment is similar to Interrupted Insertion. Specifically, the presentation time of the original media stream is converted to the presentation time of the transcoded media stream, e.g., $$u' = u\frac{q_T}{q_O} \quad (4)$$

where u, u' is the original and converted presentation time of the original media stream in units of the transcoded media stream.

At the interruption point $l_O$, the presentation time of the insertion media stream is converted to the presentation time of the transcoded media stream, e.g., $$v' = v\frac{q_T}{q_I} + l_O \quad (5)$$

where v, v' is the original and converted presentation time of the insertion video in units of the transcoded media stream.

At the resumption point time $l_O+l_I$, the system will switch from the insertion media stream back to the original media stream, with the latter's presentation times adjusted again, e.g., $$u' = u\frac{q_T}{q_O} + l_I \quad (6)$$

where u, u' is the original and converted presentation time of the original media stream in units of the transcoded media stream.

Multiple Insertions: The several insertion methods described herein can be applied more than once in the same transcoded media stream. For example, one can apply both Prefix Insertion and Postfix Insertion to insert two different media streams at the beginning and at the end of the transcoded media stream. Alternatively, one can apply multiple Midway Insertion operations to insert multiple different media streams within the transcoded media stream. The exact operations to be performed is application-specific and can be determined either a priori or dynamically at runtime for (a) a particular class of service; (b) a particular class of user; (c) a particular class of mobile devices; (d) a particular time schedule; (e) a particular type of content in the original media stream; (f) a particular source of the original media stream; or any other criteria determined by the service provider.

Insertion of Synchronized Multi-media Streams: In addition to streams with a single media, e.g., video or audio, a media stream can also comprise more than one media. A typical example is a media stream with one video and one audio, multiplexed for synchronized playback. These multimedia media streams require additional processing when performing media stream insertion in order to maintain the correct synchronization between the multiple embedded media.

Media Stream Offset: Specifically, for a multi-media media stream with N embedded media, each embedded media will have its own presentation time, denoted by $u_i$, $i=1, \ldots, N$, for the $i^{th}$ embedded media. In addition, to enable correct synchronization between the N media each media may also have a per-media parameter called stream offset, denoted by $d_i$, $i=1, \ldots, N$, for the $i^{th}$ embedded media. The final presentation time for playback is then computed from the individual media's presentation times plus the media's stream offset, i.e., $$t_i = u_i + d_i \quad (7)$$

Thus the presence of stream offset requires modifications to the presentation time conversion methods. Specifically, in converting the media's native presentation time to the transcoded media stream's presentation, the media's stream offset will need to be added in the computation. This must be done for all embedded media to maintain consistent synchronization across the multiple embedded media.

Reconciliation of Multiple Interruption Points: Second, media data are usually divided into "chunks," where each chunk is assigned a presentation time. For example, video data may be divided according to video frame boundaries, with each video frame assigned a presentation time for playback. Similarly, audio data may also be divided into audio frames, with each audio frame assigned a presentation time for playback.

Consider this example: Let $t_{i,j}$ be the media presentation time for the $j^{th}$ data chunk of the $i^{th}$ embedded media. To perform media insertion, the current media stream must first be interrupted. Let t be the time to interrupt the current media stream. Consequently all N embedded media within the media stream will need to be interrupted. However to prevent playback quality degradation, the interruption must be performed at a data chunk boundary for each individual embedded medium. This creates a problem as the data chunk boundaries of different embedded media are not necessary the same, i.e., $t_{i,j} \neq t_{x,y}, \forall i,j,x,y$.

Even if data chunk boundaries are ignored, a multi-media media stream may still multiplex the embedded media in such a way that the data are multiplexed either earlier or later than the perfect presentation time. For example, a video frame to be displayed at e.g., time t may be multiplexed ahead of. e.g., an audio frame to be displayed at an earlier time t', where t'<t. This is often a side effect of the different granularities used in the data chunk of different embedded media in the media stream.

Figure 5:
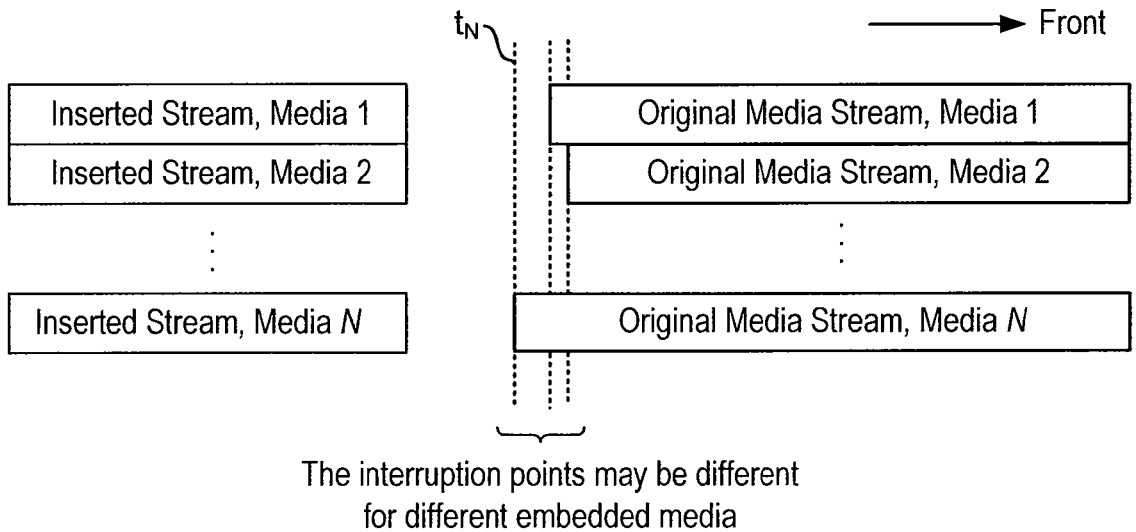
FIG. 5 is a simplified timing diagram illustrating relative timing of multiple media streams prior to insertion.
Figure 6:
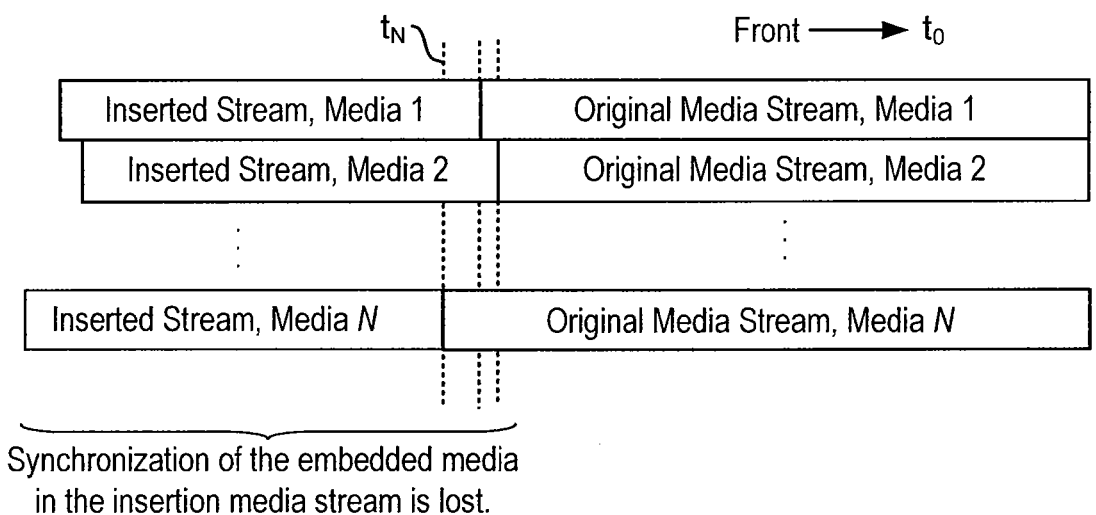
FIG. 6 is a simplified timing diagram illustrating loss of synchronization in relative timing of inserted multiple media streams after insertion.

In addition, when transmitting media data to the receiver the server typically transmits media data ahead of time, and then relies on the transmission scheduler to determine the exact time to send out the media data packet. This transport-level multiplexing may not be perfectly accurate and thus lead to media data packets from different embedded media to be transmitted in an order not strictly according to their presentation time. In either one of the above three cases the embedded media of the insertion media stream will end up beginning at different presentation times as shown by comparison between FIG. 5 and FIG. 6, leading to the loss of synchronization among the embedded media of the insertion media stream as therein illustrated.

Figure 7:
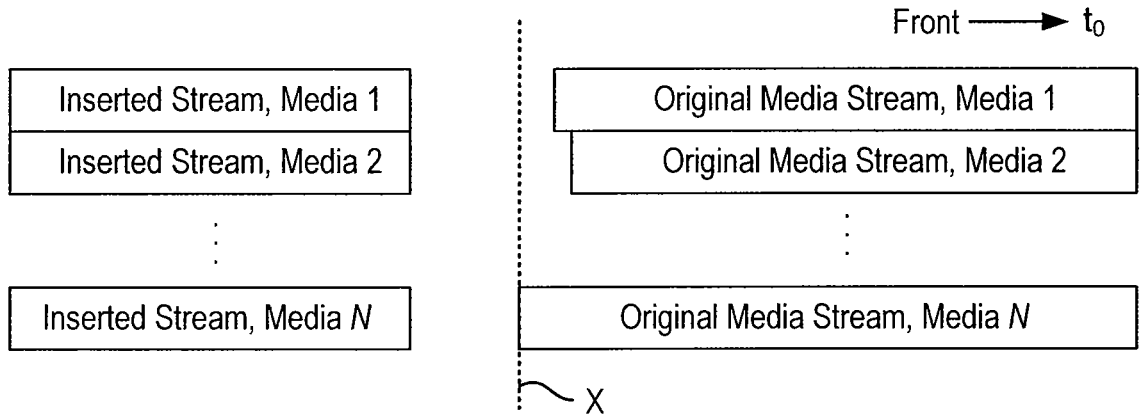
FIG. 7 is a simplified timing diagram illustrating use of a virtual interruption point for use in maintaining synchronization of inserted media streams.

The solution to this synchronization problem according to the invention is to identify, e.g., compute, a virtual interruption point from the N interruption points of the N individual embedded media of the current media stream, and then use it as the common starting presentation time for the embedded media of the insertion media stream. Specifically, let $x_i$, $i=1, \ldots, N$, be the interruption point for the $i^{th}$ embedded media of the original media stream, as constrained by factors such as data chunk boundary, encoding multiplexing, and transmission multiplexing. Then a virtual interruption point X (FIG. 7) is identified from $$X = \max\{x_i | i=1, \ldots, N\} \quad (8)$$

as depicted in FIG. 7.

Figure 8:
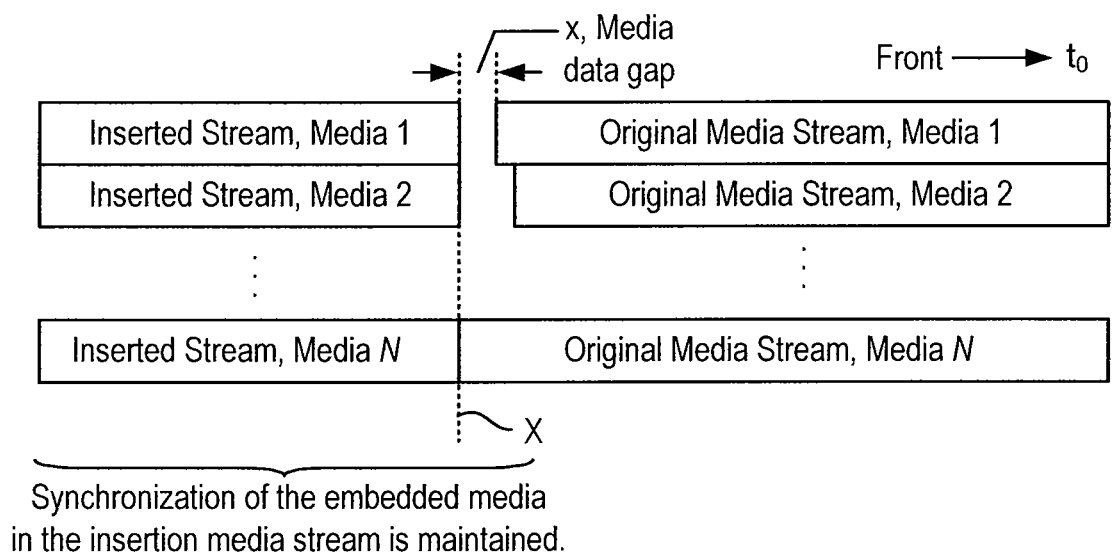
FIG. 8 is a simplified timing diagram illustrating resynchronization at the virtual interruption point for playback in synchronism.

Using this virtual interruption point the presentation times of the individual embedded media in the insertion media stream can be computed from $$v' = v\frac{q_T}{q_I} + X \quad (9)$$

where v, v' is the original and converted presentation time of the insertion media stream in units of the transcoded media stream. Consequently, as shown in FIG. 8, all N embedded media of the insertion media stream will be synchronized at the virtual interruption point X for playback at a receiver.

Techniques for Handling Media Data Gaps: It is worth noting that when applying the virtual interruption point method some of the embedded media may encounter a period of no data, known as media data gap x, as shown in Media 1 and Media 2 in FIG. 8. The effect of the media data gap x depends on the type of the media and also the implementation of the client playback mechanism, typically a software-based system. Typically video data are more resilient to data gap, since the playback software can simply keep the last frame displayed until the next video frame arrives. Audio data however, are more challenging as audio data in general cannot be repeated per se without having some audible side effect that are noticeable or even objectionable to the end users.

To address this problem, the method to determine the virtual interruption point is modified to include a maximum tolerable media data gap. Specifically, out of the N embedded media, assume media z, $1 \leq z \leq N$, has the least tolerance to media data gap. Thus to maximize playback quality the server will ensure that media z will not experience any media data gap.

To solve this, the server 18 or 24 or 42 (FIG. 1 or FIG. 2 of FIG. 3) performs two tasks. First, when the media insertion operation is started the server checks the interruption points of all N embedded media, i.e., $\{x_i, i=1, \ldots, N\}$. If the interruption point of media z is the largest one, i.e., $$\max\{x_i | i=1, \ldots, N\} = x_z \quad (10)$$

then the media insertion operation proceeds as previously outlined.

Otherwise the server holds streaming of all embedded media except media z and allows media z to continue until Equation (10) is satisfied, after which the media insertion operation is executed in as previously outlined. This modification ensures that media z, which is susceptible to media data gap, switches over to the insertion media stream's corresponding embedded media without any media data gap.

A second, complementary way to handle media data gap is to generate filler data for the media data gap so that the playback software can continue decoding and playing back the filler data while waiting for real media data to begin its transmission at the virtual interruption point. Consider, however, audio media as an example. Repeating an audio data chunk is more than likely not acceptable, as whatever audio signals encoded in that audio data chunk will be played back repeatedly, which is obviously noticeable or even objectionable to the end user and not be recoverable. Although an alternative filler audio data chunk can be generated from the audio signal that encodes audio silence, i.e., no audible signal, delay will also likely be objectionable. However, intelligent playback software upon receiving the silent audio data chunk may have sufficient built-in delay in a real-time environment to be able to decode and play back without evident silence or break. Alternatively, the playback may simply produce decoded silence, which results in silence in audio. This is arguably less objectionable to the end user than a steady sound or a repetitive sound and thus provides a complementary solution to the above problem. Note that this method can be applied in a more complex context to provide filler data for any media where media data are temporarily unavailable but the media stream must be kept alive.

Figure 9:
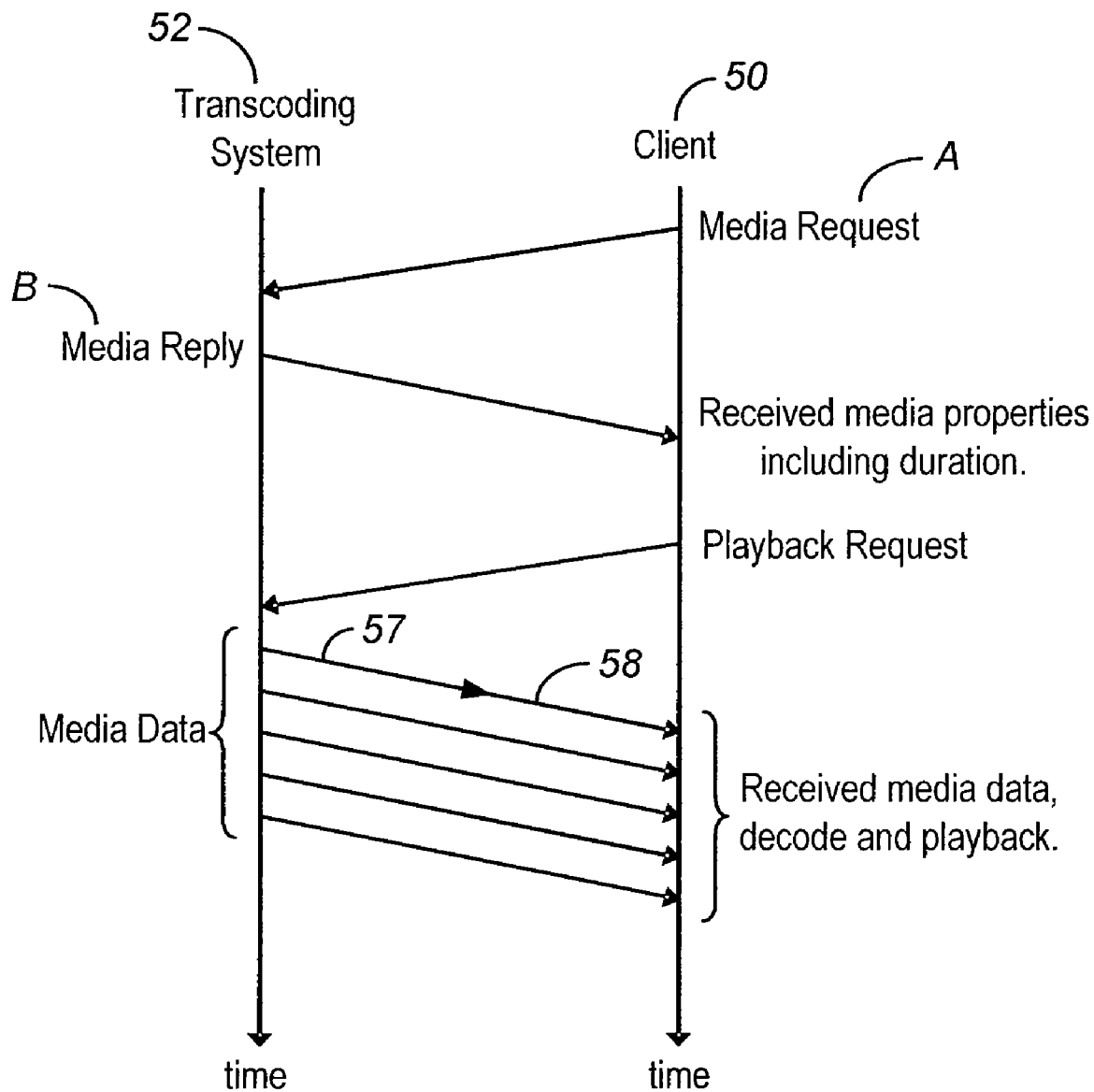
FIG. 9 is a depiction of an interactive streaming session for media streams of a known duration.

Media Streams of Known Duration: If the original media stream has a known duration then performing media stream insertion requires additional processing. Specifically, in a typical streaming session as depicted in FIG. 9, a client 50 first sends a media request A to a transcoding system 52, which after verifying the request sends back a reply B containing the properties of the requested media stream. One of these properties is the duration of the requested media. The client's playback software may use these properties to initialize its own decoding and playback software, and also set up the user interface. For example, the duration information may be displayed to the end user and also be used to set up a progress bar to show the current point of media playback.

When stream insertion is performed the resultant transcoded media stream will likely have a different duration than the original media stream, which is reported. For example, if Prefix Insertion or Postfix Insertion is performed, then the resultant transcoded media stream will have a longer duration than the original media stream. This creates a problem as the duration information would have already been sent to the client, thus inaccurately reflecting actual duration. This could lead to two problems. First, whatever information generated that is based on the original media stream, such as media duration or playback point progress bar display, duration will now become inaccurate. Second, when the client playback software reaches the original media stream duration in its execution, it may terminate the stream even if there are media data yet to be transmitted for playback. This is because many playback protocols keep track of the playback time, so that when the protocols reach the end of the stream as reported in the initial media reply from the server, they will simply stop and terminate the streaming session. This is clearly undesirable as the media playback will be incomplete, missing the ending portion of the media stream.

According to the invention, to resolve this problem, the transcoding server 52, during the initial session setup with the client playback device 50, reports a virtual media duration instead of the actual media duration. The virtual media duration is computed from the sum of the actual media stream duration and the estimated durations of one or more of the insertion media streams. The exact estimation method is application-dependent. In the simplest form, the estimate can simply be the duration of the insertion media stream. Using this virtual media duration method the reported media duration then becomes longer than the actual media stream. Thus even if media stream insertion is performed, the client is still be able to play back the entire duration of the actual media stream within the allotted time.

Techniques for Extending Media Streams: In a transcoding session it is possible for the actual media stream to end before reaching the media duration reported to the client play back device. One possible cause for this problem is the use of virtual media duration as described herein above. A second possible cause is that the actual video duration as decoded by the system may in fact be incorrect. A third possible cause is that the individual embedded media in a multi-media media stream may be of different durations, and thus some of the embedded media may end earlier than the others. In any case, the consequence is that a media data gap will appear at the end of one or more embedded media programs. Some playback devices may treat the media data gap as data loss, and if a predetermined threshold is exceeded, it may incorrectly report a network problem to the end user and prematurely ends the media streaming session.

According to the invention, this problem in the transcoding system is resolved by causing the transcoding system to insert one or more filler media streams between the end of the actual media stream and the end of the reported media stream duration. For multi-media media streams, separate filler media 57 is inserted for each embedded media 58 that ends before the reported media stream duration. The filler media stream depends on the type of the media and the requirements of the applications. For example, a video filler stream may display textual information to inform the user that the video stream has ended; an audio filler stream may render aural information to inform the user that the audio stream has ended, or use a silence audio stream as filler. If the filler stream is shorter than the media data gap it can be repeatedly inserted using Postfix Insertion until the end of the media stream duration is reached. This media stream extension algorithm can keep the network connection to the client playback device alive and prevent the playback device from incorrectly reporting network errors.

The computed the virtual media duration for the system can be a conservative estimate of a longer duration to ensure that the actual media stream will always be played back entirely. Any excess duration will then be handled by the media stream extension techniques to ensure correct operation of the client playback software.

A media stream extension can handle the case where media duration is not known but it is necessary to report a media duration to the client playback device, e.g., to enable certain features that are only available for media with known duration (e.g., pause/resume feature in certain mobile devices). In this case the system can report a virtual media duration that is sufficiently long so that it is longer than all or at least the majority of the actual media contents accessible by the end user (e.g., 4 hours). When the actual media stream reaches its natural end, then the system can simply execute a media extension algorithm to keep the connection alive and to inform the user (e.g., visually or aurally) of the stream's completion. The user is then prompted to terminate the stream session manually and the streaming session will be disconnected normally without generating any network error reports.

Figure 11:
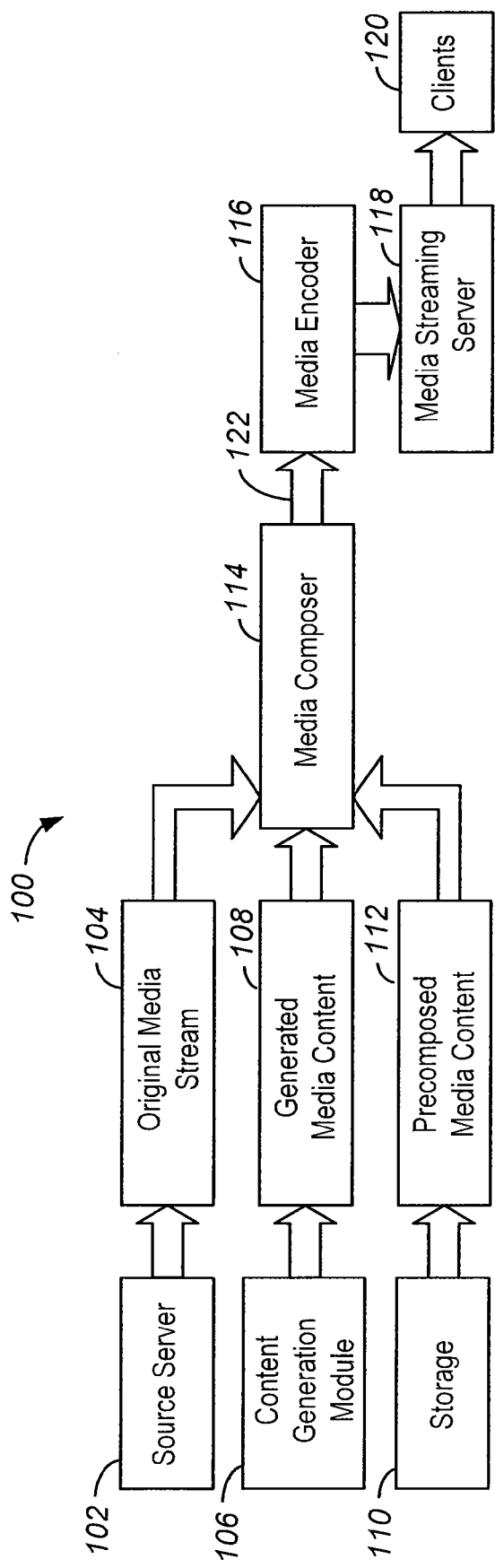
FIG. 11 is a block diagram of a system for dynamic stream composition and insertion according to the invention.

Techniques for Dynamically Composing and Inserting Media Streams: In addition to inserting pre-encoded media stream into the transcoded media stream, the invention includes a technique to dynamically compose and insert media streams into the transcoded media stream. The primary difference from pre-encoded media stream is that the media content in this technique is generated and rendered at runtime and in real-time. Referring to FIG. 11, the technique and an apparatus embodying the dynamic composer 100 is illustrated. A source server 102 provides an original media stream 104 as one source of content. A content generation module 106 provides as a further source generated media content 198, and a storage device 110 provides archival or precomposed media content 112. The original, generated and precomposed media contents 104, 108, 112 are supplied to a media composer 114 according to the invention after the media contents are generated as depicted in FIG. 11 for insertion into the transcoded media stream. The media composer 114 dynamically determines which media of the other media sources 106, 110 to insert into the current transcoded media stream 104 for real-time encoding in a media encoder 116, transfer to a media streaming server 118 and transmission to clients 120. All of the insertion operations mentioned herein above can be implemented by the dynamic media stream composition and insertion method. The presentation time of the final transcoded media stream 122 will be generated by the media composer, with the source media's presentation time converted according to the conversion algorithms described herein above.

Method for Startup Delay Reduction: Startup delay refers to the time between the user initiates a new media streaming session to time media playback starts. This is an important performance metric and it is desirable to keep the startup delay as short as possible to improve quality of service. Apart from the issue of waiting, transcoding and streaming media in real-time to mobile devices present a challenge in that there is a limited delay tolerance of the mobile device during connection setup.

Specifically, in a conventional client-server type streaming architecture, the client can expect to receive a reply from the server in a relatively short time after it has sent the server a media request. If the server does not reply after a period of time, most client playback software will time out and report to the user that there is a problem with the network/server connection. While this works well in conventional client-server streaming systems, it may cause problems in real-time transcoding systems.

Figure 10:
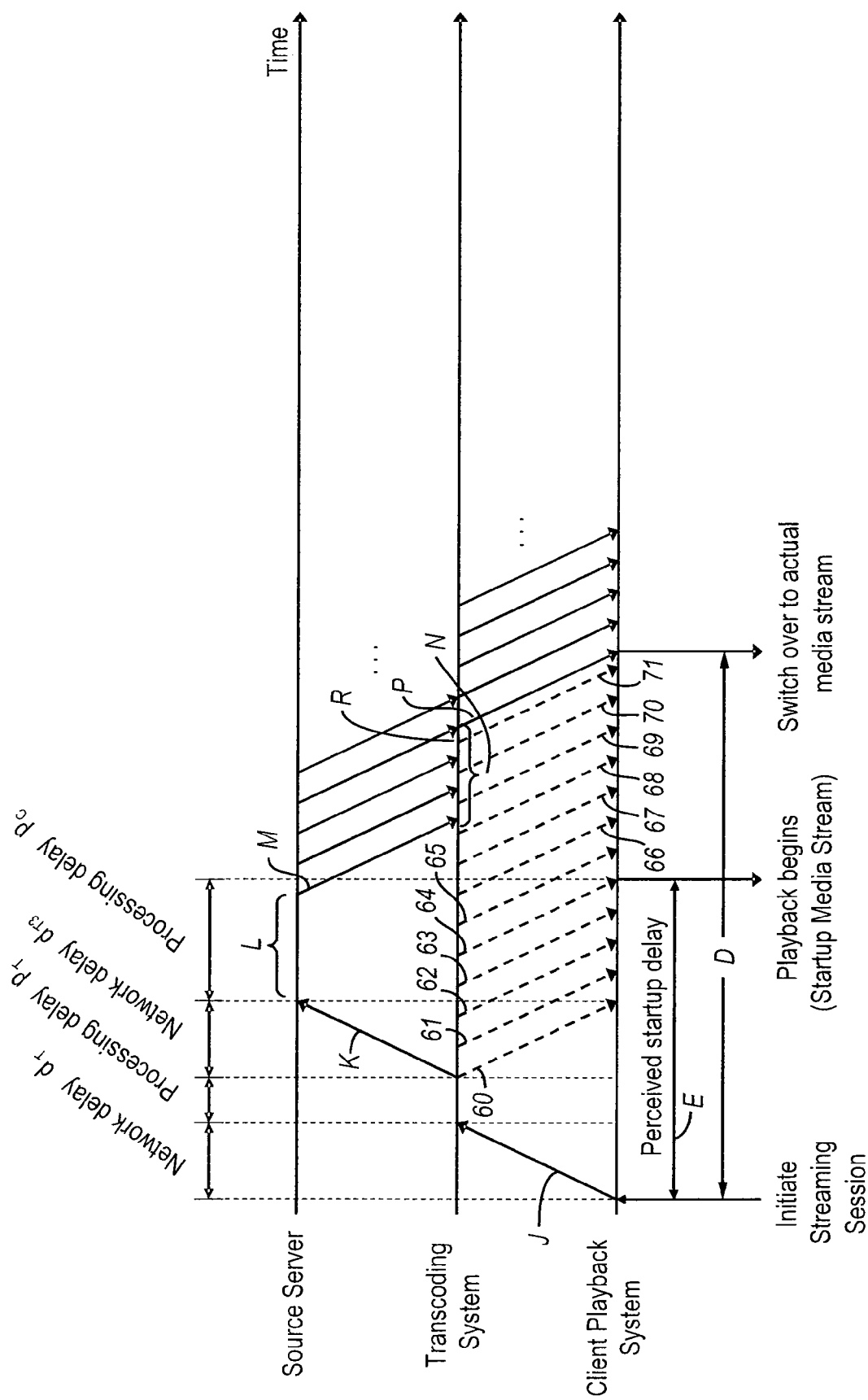
FIG. 10 is depiction of an interactive streaming session for dealing with media streams with perceived delays that differ from actual delays.

FIG. 10 also can be used to illustrate a solution to this problem using a timing diagram to show the protocol interactions between the client playback software, the transcoding system, and the source server providing the original media content over the Internet. The client first sends a media request to the transcoding system (Step J), which then processes the request and sends a corresponding media request to the source server (Step K) to request the original media content. Upon receiving the media request, the source server processes it (Step L) and begins sending the media data to the transcoding system (Step M). Upon receiving the media data the transcoding system transcodes the media data (Step N) and then streams the transcoded media data to the client (Step P). As the figure illustrates the conventional startup delay, denoted by D, in this case is given by:

$$D = d_T + p_T + d_S + p_S + d_{T2} + p_{T2} + d_{T3} + p_C \quad (11)$$

where $d_T$ is the network delay for sending the media request from the client to the transcoding system; $p_T$ is the processing time of the media request by the transcoding system; $d_S$ is the network delay for sending the corresponding media request from the transcoding server to the source server; $p_S$ is the processing time of the source server; $d_{T2}$ is the network delay for sending data from the source server to the transcoding system; $p_{T2}$ is the processing time of the media data by the transcoding server; $d_{T3}$ is the network delay for sending the transcoded media data to the client; and $p_C$ is the processing time (e.g., initialization and buffering) of the client.

From this example, the startup delay is significantly longer than conventional client-server streaming systems, as extra delays are incurred in sending requests to the source server, and in receiving and transcoding the original media data, before usable media data can be sent back to the client. This longer startup delay not only increases the waiting time experienced by the user, but in some cases, the delay can exceed the timeout threshold of the client playback software, in which case the client playback software will mistakenly declare a connection failure to the user. This is obviously a serious problem as once the connection setup process timeout, the entire stream session will be terminated by the client playback software.

To solve this problem, a pipelined connection setup method is used according to the invention to shorten the startup delay so that the user will experience a shorter apparent startup delay and the client playback software will not timeout in waiting for the transcoded media data to arrive. The pipelined connection setup method is illustrated in FIG. 10.

As before, the client first sends a media request to the transcoding system (Step J), which then processes the request and sends a corresponding media request to the source server (Step K) to request the original media content, and processing continues. At the same time, before and during the further requests and processing delays (Steps K, L, M), the transcoding system streams to the client a startup media stream set 60-71 (Step Q) as shown by the dotted arrows in FIG. 10. This startup media stream set 60-71 is either precomposed and encoded (inserted using Prefix Insertion), or composed and encoded in real-time by the transcoding system. The content of the startup media stream is for example composed according to the service offered and the desired information to be presented to the user. For example, the startup media stream 60-71 may display visual information to inform the user that the actual media data is being requested. The transcoding system may be equipped with more than one version of the startup media stream and the selection of the startup media stream could be based on parameters to be defined by the service provider.

The startup media stream 60-71 enables the transcoding system to send back media replies to the client playback software significantly earlier than in the convention case. This provides a perceived startup delay E that ensures that the actual startup delay will not exceed the timeout threshold of the client playback software, and also inform the user of the progress of the streaming session. This could also increase the waiting tolerance of the user and improve service quality.

Upon receiving the media request the source server will process it (Step L) and begin sending the media data to the transcoding server (Step M). Upon receiving the media data the transcoding server will transcode the media data and then stop sending the startup media stream (Step R) and replace it by the actual transcoded media stream (Step P as shown as solid arrows). The startup delay, denoted by D, in this case is reduced significantly and is given by $$D = d_T + p_T + d_{T3} + P_C \quad (12)$$

where $d_T$ is the network delay for sending the media request from the client to the transcoding system; $p_T$ is the processing time of the media request by the transcoding system; $d_{T3}$ is the network delay for sending the transcoded media data to the client; and $p_C$ is the processing time (e.g., initialization and buffering) of the client.

Method for Connection Setup for Audio-Only and Video-Only Media Streams: The pipelined connection setup method creates a new problem when the user requested a media that contains only audio or only video. Normally Internet media contents are composed of audio and video in a multiplexed media stream. As the transcoding server under pipelined connection setup will send back media reply before actual media data are received from the source server, it may not be able to determine the exact composition of the requested media stream. In some cases the composition of the media stream can be inferred from meta-data such as file name, file extension, URL, etc. However in some cases such information may not be available or it may be unreliable.

Thus the transcoding server during pipelined connection setup will by default reply to the client that the media stream contains both audio and video. In cases where the actual media stream is an audio-only stream, then the transcoding server will insert a filler video using methods described herein above on fillers to enable the client playback software to decode and play back the actual audio, accompanied by a filler video informing the user that the media stream contains no video content.

Similarly, in case where the actual media stream is an video-only stream, then the transcoding server will insert a filler audio to enable the client playback software to decode and play back the actual video, accompanied by a filler audio that (a) informs the user that the media stream contains no audio content; (b) renders silence audio; or (c) any other aural information appropriate for the service offered.

Method for Error Reporting: In a transcoding system the client's playback software will not know that the media data are sourced from the Internet and then transcoded for its playback because client playback software is not designed to handle error conditions related to the transcoding process. This includes but is not limited (a) unavailability of the source server; (b) unavailability of the Internet connection; (c) congestion on the network path to the source server; (d) congestion of the source server; (e) invalid media data; (f) corrupted media data; (g) undecodable media data; (h) disrupted connection to the source server; and (i) unavailability of the requested media stream.

In all the above mentioned cases there is a need to inform the user that the media request failed because of problems originating outside the transcoding system and the mobile network. However, all such error conditions are treated as and reported as network error to the end user. This is clearly extremely undesirable as it gives the false impression that the mobile network has failed, which in fact the mobile network is fully operational.

Figure 13:
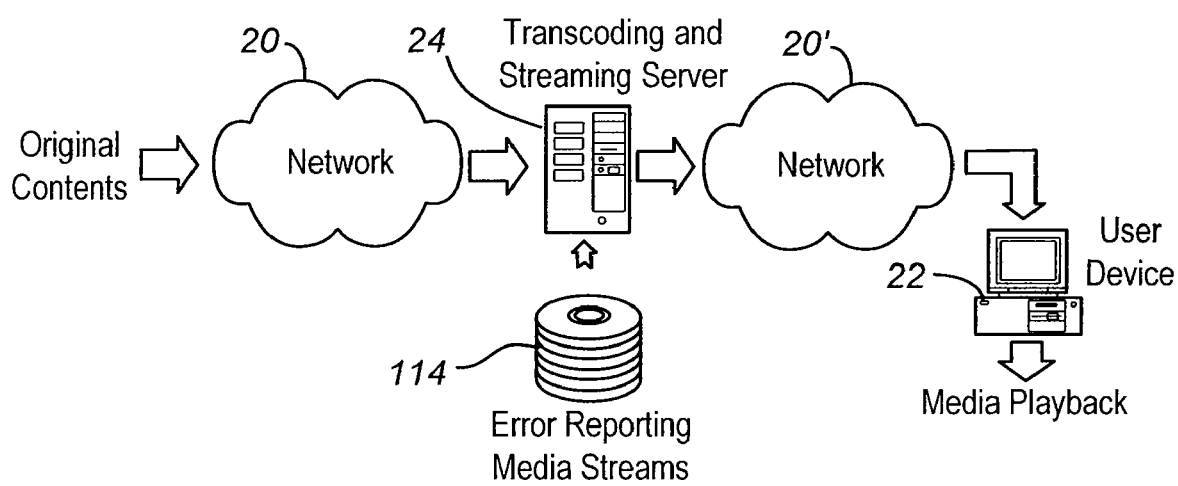
FIG. 13 is a block diagram of a system of FIG. 1, 2 or 3 augmented with error reporting media streams.

To address this problem, and referring to FIG. 13, a method is provided to report error conditions to the end user by means of media stream insertion from a supplemental source 114 coupled to the transcoding server 24 that communicates with the network clouds 20, 20'. Specifically, for each error condition, one or more media streams is created for display to the end user station 22 to explain the source of the failure. Thus when the error condition occurs, the transcoding system 24 switches over to the source 114 of error media stream using methods described herein above otherwise used for display to the end user station 22. Thereby, the client playback software simply receives, decodes and plays back the error media stream as if the media streaming session were successful. This prevents the client from reporting network connection errors and at the same time allows the transcoding system 24 to convey to the user the outcome of the media request. This new error reporting method does not require any modification to the client playback software and can support any operator-defined error conditions.

The following pseudo-code illustrates this technique.

Pseudo-Code Examples for Error Reporting
(Example—Origin Server Error)
01 Scenarios: invalid URL, server downtime, network failure, etc.
02 Actions:
  03 Perform requested transcoding task.
  04 Detect origin server error condition via transcoding system.
  05 Find the appropriate error video/audio message for the condition. If none found then fallback to default error message.
  06 Determine the appropriate version of the error message, e.g., based on language preference, audio only, video only, audio+video, etc.
  07 Perform interrupted media insertion to stream the error message to the und user (mobile handset).
  08 If the media duration is not yet reached, then repeat Step 07.

Method for Adaptive Smoothing of Real-Time Streaming Data: Mobile devices are usually connected via lower-speed networks than are used for conventional computer networking. However, media data such as video are usually generated in units of data chunks, such as extended packets, video frames, etc. For example, a video stream will comprise a series of video data chunks, each data chunk encoding a video frame that is to be played back at a pre-specified presentation time.

In conventional media stream servers these media data chunks are typically transmitted according to their presentation time. For example, video data will be scheduled for transmission in terms of individual video frames. However, many known media compression algorithms generate variable-sized data chunks. For example, video data are often encoded into I frames and P/B frames, where an I frame is significantly larger in size than a P or B frame.

In case the media data chunk is larger than the network transport's payload size, the server needs to divide the large data chunk into multiple network data units for transmission. This burst of network data units, all corresponding to the same media data chunk, is transmitted at the speed of the server's network interface, which is often significantly higher than the access bandwidth of the mobile device. Consequently, when the bursts of data units reach the mobile network's wireless interface, congestion may occur leading to data loss. The lost data, typically packets, will be manifest as playback quality degradations at the client and is obviously extremely undesirable.

Figure 12:
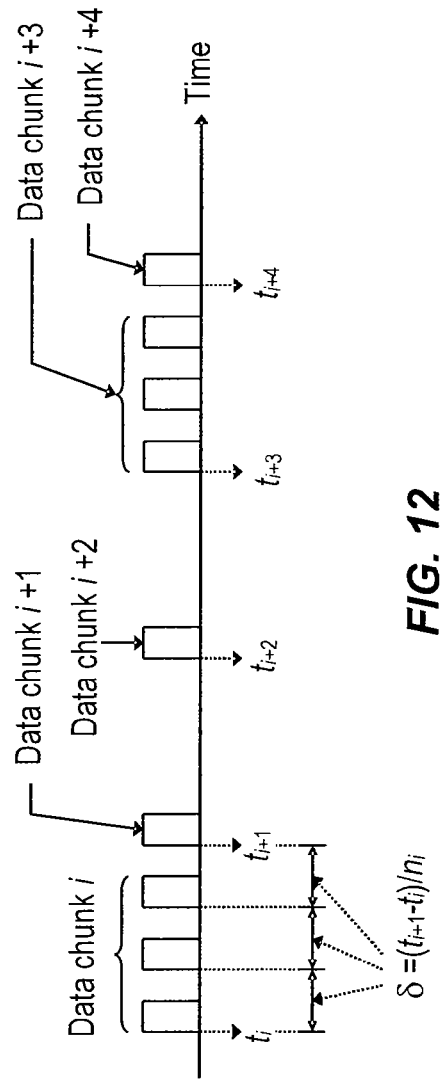
FIG. 12 is a block timing diagram illustrating traffic smoothing

To overcome this problem, an adaptive traffic smoothing method is provided that reduces the likelihood of network congestion. According to the invention, each media data chunk is assigned a scheduled transmission time, denoted by $t_i$, for the $i^{th}$ data chunk. Let $n_i$ be the number of network data units corresponding to data chunk i. Then to transmit data chunk i the server inserts artificial delay, denoted by $\delta$, between the network data units of the data chunk, as depicted in FIG. 12. The artificial delay can either be a preset value or computed dynamically from $$d=(t_{i+1}-t_i)/n_i \qquad (13)$$

This adaptive smoothing algorithm reduces the short-term data rate of the burst of data units for a media data chunk, thus significantly reducing the likelihood of network congestion and consequently unnecessary data loss.

The invention has now been explained with reference to specific embodiments. Other embodiments will be evident to those of ordinary skill in the art. It is therefore not intended that this invention be limited, except as indicated by the appended claims.

What is claimed is:

1. A system for transcoding digitized media data in connection with a video server for playback at an end user device, said system comprising:
  a media server machine of a content provider;
  a transcoding and streaming server machine; and
  a user profile supplier device coupled to provide user profiles to said transcoding and streaming server under control of a service provider;
  said media server machine being connectable to said transcoding and streaming server machine and wherein said transcoding and streaming server machine is integrated with said service provider and independent of control of said content provider,
  said transcoding and streaming server machine being connectable to an end user device and wherein transcoded media format, encoding parameters and communication protocol are compatible with said end user device, said transcoding and media server machine being configured to:
  identify type of insertable streaming media;
  identify a candidate point in said transcoded communication stream at said transcoding and streaming server for inserting said insertable streaming media among a prefix position, intermediary positions and a postfix position;

insert said insertable streaming media at said candidate point such that said insertable streaming media are in synchronism and are compatible with said transcoded media stream at said candidate point; and identify a virtual insertion point from among ends of a plurality of transcoded media streams, and re-synchronize said plurality of said insertable streaming media to said virtual insertion point.

2. The system according to claim 1 further including a media error reporting mechanism coupled to and reporting to said transcoding and media server.

3. A method for inserting streaming media in a transcoded communication stream, the method comprising:

involving a plurality of insertable streaming media to be synchronized in a system for transcoding digitized media data in connection with a video server for playback at an end user device and having a media server of a content provider and a transcoding and streaming server, wherein duration of said insertable media is unknown;

identifying type of said insertable streaming media;

identifying a candidate point in said transcoded communication stream at said transcoding and streaming server for inserting said insertable streaming media among a prefix position, intermediary positions and a postfix position;

inserting said insertable streaming media at said candidate point such that said insertable streaming media are in synchronism and are compatible with said transcoded media stream at said candidate point; and identifying a virtual insertion point from among ends of a plurality of transcoded media streams, and re-synchronizing said plurality of said insertable streaming media to said virtual insertion point.

4. The method according to claim 3 wherein said insertable streaming media are inserted based on media size, including duration.

5. The method according to claim 3 wherein said inserting step comprises interrupting said transcoded media stream.

6. The method according to claim 3 further including the step of re-synchronizing said transcoded media stream at least after said inserting step.

7. A method for inserting streaming media in a transcoded communication stream, the method comprising:

identifying type of insertable streaming media in a system for transcoding digitized media data in connection with a video server for playback at an end user device and having a media server of a content provider and having a transcoding and streaming server, wherein duration of said insertable media is unknown;

identifying a candidate point in said transcoded communication stream at said transcoding and streaming server for inserting said insertable streaming media among a prefix position, intermediary positions and a postfix position;

inserting said insertable streaming media at said candidate point such that said insertable streaming media are in synchronism and are compatible with said transcoded media stream at said candidate point; and identifying a media unit of said transcoded media stream and preparing said insertable streaming media for insertion seamlessly at said prefix position before said transcoded media stream adjacent boundaries of said media unit, including reformatting said insertable streaming media according to a common time base with said transcoded media stream, and concatenating said transcoded media stream at a boundary of a media unit of said insertable streaming media.

8. A method for inserting streaming media in a transcoded communication stream, the method comprising:

identifying type of insertable streaming media in a system for transcoding digitized media data in connection with a video server for playback at an end user device and having a media server of a content provider and having a transcoding and streaming server, wherein duration of said insertable media is unknown;

identifying a candidate point in said transcoded communication stream at said transcoding and streaming server for inserting said insertable streaming media among a prefix position, intermediary positions and a postfix position; and inserting said insertable streaming media at said candidate point such that said insertable streaming media are in synchronism and are compatible with said transcoded media stream at said candidate point;

identifying a media unit of said insertable streaming media and preparing said insertable streaming media for insertion seamlessly at said postfix position after said transcoded media stream adjacent an end boundary of said media unit of said transcoded media stream.

9. The method according to claim 3 wherein said insertable streaming media are inserted based on media type.

10. A method for inserting streaming media in a transcoded communication stream, the method comprising:

making available an expected duration of insertable streaming media in a system for transcoding digitized media data in connection with a video server for playback at an end user device and having a media server of a content provider and a transcoding and streaming server, wherein duration of said insertable media is unknown;

identifying type of said insertable streaming media;

identifying a candidate point in said transcoded communication stream at said transcoding and streaming server for inserting said insertable streaming media among a prefix position, intermediary positions and a postfix position;

inserting said insertable streaming media said candidate point such that said insertable streaming media are in synchronism and are compatible with said transcoded media stream at said candidate point;

reading said expected duration; and adjusting actual delay to accommodate said expected duration plus a factor to account for an insertion delay.

11. The method according to claim 10 wherein said actual delay is determined using a virtual media duration method.

12. The method according to claim 7 further including the steps of:

detecting at said transcoding and streaming server an origin server error condition; thereupon formulating an appropriate error message for presentation to the end user; and performing interrupted media insertion to add the error message to the media stream sent to the end user.

13. The method according to claim 12 further including modifying said appropriate error message according to duration of said origin error condition.

14. The method according to claim 3 wherein said insertable media stream is for use as filler for periods where reported media stream duration differs from embedded media duration, said insertable media stream being pre-encoded to conform to the transcoded communication stream in order to avoid false reports of network errors.

15. The method according to claim 3 wherein said insertable media stream is for use as filler for periods where reported media stream duration differs from embedded media duration, further including the steps of generating an insertable media stream in real time.

16. A method for inserting streaming media into a transcoded communication stream comprising:
   identifying type of insertable streaming media in a system for transcoding digitized media data in connection with a video server for playback at an end user device, said system having a media server of a content provider and a transcoding and streaming server;
   identifying a candidate point in said transcoded communication stream at said transcoding and streaming server for inserting said insertable streaming media among a prefix position, intermediary positions and a postfix position;
   inserting said insertable streaming media at said candidate point such that said insertable streaming media are in synchronism and are compatible with said transcoded media stream at said candidate point; and
   causing the transcoding system to stream a startup media stream set to the end user before the source server begins transmission of the source media stream in order to reduce startup delay.

17. The method according to claim 16 wherein said startup media stream is pipelined.

18. The method according to claim 16 wherein media data units are larger than payload size of network transport, further including adaptively smoothing traffic by assigning each media unit a scheduled transmission time and inserting artificial delays into real-time stream data.

19. The method according to claim 3 wherein media data units are larger than payload size of network transport, further including adaptively smoothing traffic by assigning each media unit a scheduled transmission time and inserting artificial delays into real-time stream data.

20. The method according to claim 3 further comprising causing the transcoding system to stream a startup media stream set to the end user before the source server begins transmission of the source media stream in order to reduce startup delay.

21. The system according to claim 1 wherein said media server machine is connectable to said transcoding and streaming server machine via a network cloud and said transcoding and streaming server machine is connectable to said end user via the network cloud.

22. The system according to claim 1 wherein said media server machine is connectable to said transcoding and streaming server machine via a first network cloud and said transcoding and streaming server machine is connectable to said end user via a second network cloud.

* * * * *